United States Patent [19]

Baker

[11] 3,934,916
[45] Jan. 27, 1976

[54] VACUUM PICKUP CUP

[75] Inventor: Thomas R. Baker, Redwood City, Calif.

[73] Assignee: Kliklok Corporation, Greenwich, Conn.

[22] Filed: Dec. 3, 1974

[21] Appl. No.: 529,225

Related U.S. Application Data

[62] Division of Ser. No. 436,612, Jan. 25, 1974.

[52] U.S. Cl............... 294/64 R; 271/103; 271/106; 294/65
[51] Int. Cl.² .......................................... B66C 1/02
[58] Field of Search........ 294/64 R, 65, 86 R, 99 R; 92/92, 97, 99, 105; 214/1 BS, 1 BT, 650 SG; 271/103, 106

[56] References Cited
UNITED STATES PATENTS

| | | | |
|---|---|---|---|
| 2,916,059 | 12/1959 | Wong | 294/64 R X |
| 3,039,767 | 6/1962 | Staines | 271/106 X |
| 3,343,864 | 9/1967 | Baer | 294/99 R |
| 3,362,706 | 1/1968 | Busse | 294/64 R X |
| 3,601,442 | 8/1971 | Orndorff | 294/99 R |
| 3,656,794 | 4/1972 | McCord | 294/64 R |

Primary Examiner—Evon C. Blunk
Assistant Examiner—Johnny D. Cherry

[57] ABSTRACT

An article transfer apparatus and method is provided wherein a plurality of article pickup heads mounted on a movable support means is operative to pick up a plurality of spaced articles at a transfer station and move the articles to an output area while the array of articles is being compacted or spread, as desired. The adjustment of the space between the articles is accomplished by making the pickup heads in the form of collapsible suction cups with anti-collapse stiffening means on one side of the cups to tilt the articles either inwardly or outwardly with respect to the original article pattern. The stiffening means in the suction cup includes wedge members mounted in annular folds of the cup and interconnecting beads between the wedge members. The bottom fold is normally not provided with a wedge member and the lip serves to seal the cup on the article. A bifurcated wedge member is provided on the top of the cup and serves to cooperate with index means on the movable support. A second support means with pickup heads to handle a second array may be provided with mechanical mechanism to shift the two supports toward or away from each other.

5 Claims, 10 Drawing Figures

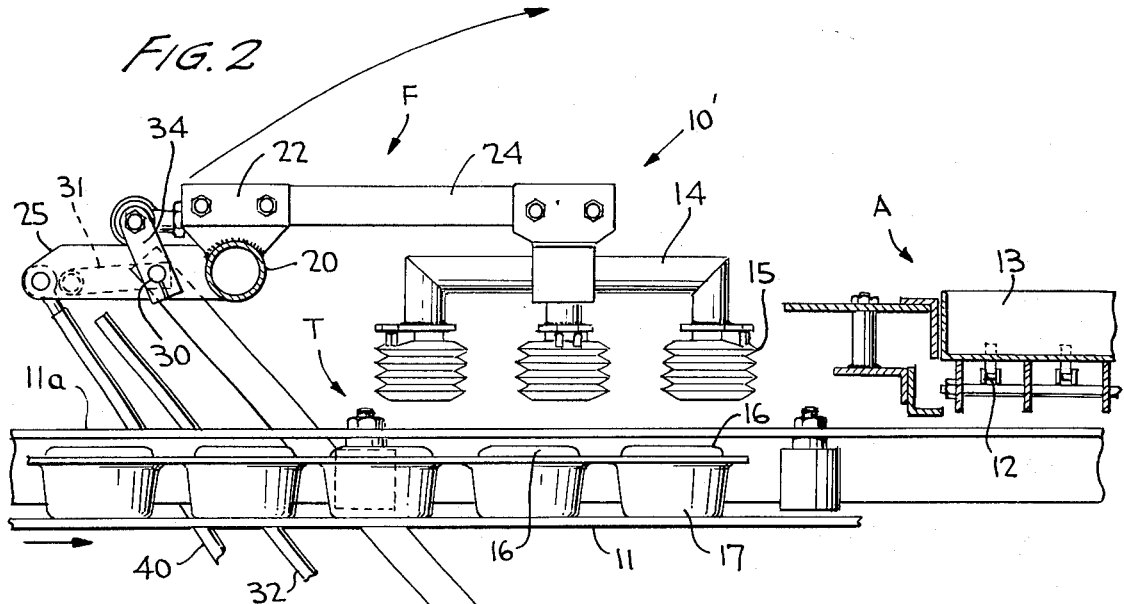
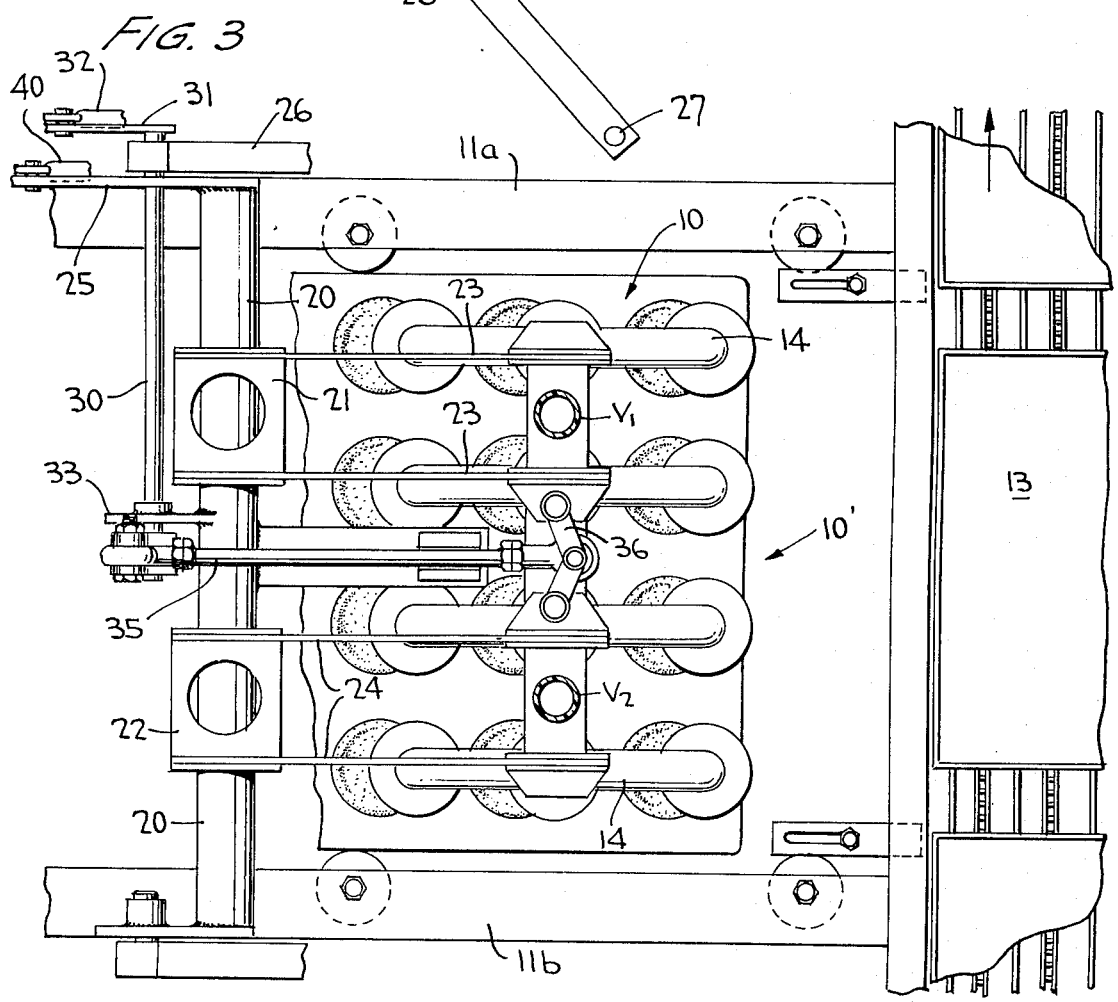

3,934,916

VACUUM PICKUP CUP

This is a division of application Ser. No. 436,612, filed Jan. 25, 1974.

The present invention relates to an article transfer system, and, more particularly, to an apparatus and method for effecting either compaction or spreading of an array of articles during the transfer operation.

BACKGROUND OF THE INVENTION

It is generally known to use gang mounted vacuum pick-up cups for handling articles of many different descriptions. The primary use of which I am aware and the general area to which the apparatus and method of the present invention is directed, pertain to packaging machines having an article handling section where articles are grouped, and then picked up and transferred from one conveyor to a carton on another conveyor. The articles are usually picked up as a planar array of spaced articles and placed at the output area in the same general orientation, such as shown by the Powell U.S. Pat. No. 1,987,336, issued Jan. 8, 1935.

In the general area of moving a group of spaced articles by a gang of suction cups, it is sometimes desirable to modify the pattern of the articles during the transfer operation. For example, where a number of articles are to be placed in a compact pattern in a container or box, it has been found desirable to compact or shrink the pattern during transfer so that the articles neatly and snugly fit the container. One method of accomplishing this end result is shown in the Voullaire U.S. Pat. No. 3,318,068, issued May 9, 1967. In this patent, there is shown a scissors-like linkage system operative to reduce the outer dimensions of the group of articles in one direction. The mechanism used is relatively complicated and requires a separate servo mechanism to make the pattern shift. The shifting is accomplished only by moving certain of the articles in a vertical direction, which renders the mechanism generally unsuitable for assuring both gentle handling of the articles and single plane positioning in the output area.

Thus, a particular need for improved article handling of the type described exists in the area of handling relatively delicate pieces, such as bread products, including muffins and individual cakes. In this particular environment, I am unaware of a successful system for (1) picking up the individual baked goods articles from the pans in which the cooking takes place; (2) shrinking the pattern by a simple tilting action; and (3) transferring the articles while still in a single planar array to the box or tray in which the goods are packaged for sale. An arrangement, such as shown in the Voullaire patent, cited above, that shifts the articles vertically twice during a single cycle would not be successful in such an environment since the edges of the articles would likely interfere with each other as the articles move past each other, resulting in unacceptable breakage and spoilage of the product.

It is an object of the present invention to provide a suction cup, that provides efficient pickup, transfer, deposit and simultaneous tilting of the articles, said tilting serving to generate the desired pattern shrinking or expansion to meet the spatial requirements of the output area that may be different from the original transfer station.

It is another object of the present invention to provide a suction cup sub-combination that provides for tilting of the article or articles by differential collapse across the cup.

BRIEF DESCRIPTION OF THE INVENTION

In accordance with the present disclosure an article transfer system is provided wherein a planar array of spaced articles are transferred from one position to a second position and during the transfer operation the array is changed so as to fit a different spatial requirement in said second position. Specifically, the transfer system includes an infeed conveyor providing a group of articles in a planar array, a plurality of corresponding pickup heads, movable support means for the heads to shift the articles from the input transfer station to the output area, and means to tilt the individual pickup heads to compact or spread the array as desired or required. The pickup heads are in the form of collapsible suction cups and are connected to a vacuum source through a pneumatic manifold that forms the movable support means.

The tilt means, in accordance with the present invention in more specific terms, comprises an anti-collapse stiffening means on one side of the cups opposite to the direction to the tilting action. Preferably, the cups are of the accordion type with a plurality of annular folds. The stiffening means then most conveniently takes the form of wedge members provided in the folds to prevent the collapse of that side of the cup. In a preferred embodiment, the bottom fold forms a lip that serves to seal the cup on the article for pick up. Between the wedge members on the inside of the cup is provided reinforcement bead means to further assure against collapse of that side of the cup. A bifurcated wedge member is provided on the top of the cups and cooperates with index means to assure not only against collapse at this location, but also to assure proper positioning of the cups on the support means.

In the preferred transfer system shown, the array of articles being transferred is in the form of a polygon. The corner cups of the polygon are positioned to tilt directly toward the center at an acute angle to both adjacent sides and the cups positioned along the sides are directed to tilt toward the center normal to the sides, thereby giving complete two-dimensional horizontal adjustment.

In accordance with the present invention, the suction cups may be turned 180° around so that the tilting action is directed away from the center of the polygon, in which case spreading rather than shrinking of the pattern is accomplished. If two arrays of articles are to be handled on one machine, there may be provided shifting means for the first and second support means that effects composite spatial positioning of said first and second arrays, i.e., shifting toward or away from each other to give further adjustment or a desired variation in adjustment of the pattern. In the preferred embodiment illustrated herein, shifting toward each other compensates for the opposite or away tilting action of the adjacent rows of articles of the two arrays.

In accordance with the more specific features of the invention pertaining to the sub-combination pickup cup, the tilting means is formed by integral stiffening means on the side of the body of the cup. The broad concept is that the stiffening means resists collapse and thereby tilts the article that is picked up. This integral means takes the form of wedge members that are molded into the annular folds of the vacuum cup, which may be fabricated of a suitable resilient material, such as rubber. Other integral means to cause differential collapse can be employed, such as cup wall thickness variation.

In the related method of transferring and positioning an array of separate articles according to the teachings of the present disclosure, the articles are picked up by the vacuum cups, substantially simultaneously tilted by differential collapse across the cup to provide the required new spatial positioning, and then moved to the output area where the vacuum is broken and the articles released. By tilting the articles when the cups pick up the same at an angle of between fifteen and thirty degrees, the articles can be moved in and out of restricted areas, such as a packaging tray, as desired. Also, when bakery products or the like are handled, the tilting step advantageously provides initial equalization of the pressure between the articles and the inside walls of the containers, i.e., sections of muffin pans, to assure gentler removal and handling of the products.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

BRIEF DESCRIPTION OF THE DRAWINGS

FIG. 2 is a side view of the apparatus, taken along line 2—2 of FIG. 1 including the articles on the infeed conveyor and the packaging tray to which the articles are to be transferred;

FIG. 3 is a top plan view of the apparatus illustrated in FIGS. 1 and 2;

DETAILED DESCRIPTION OF THE PREFERRED EMBODIMENT

Figure 1:
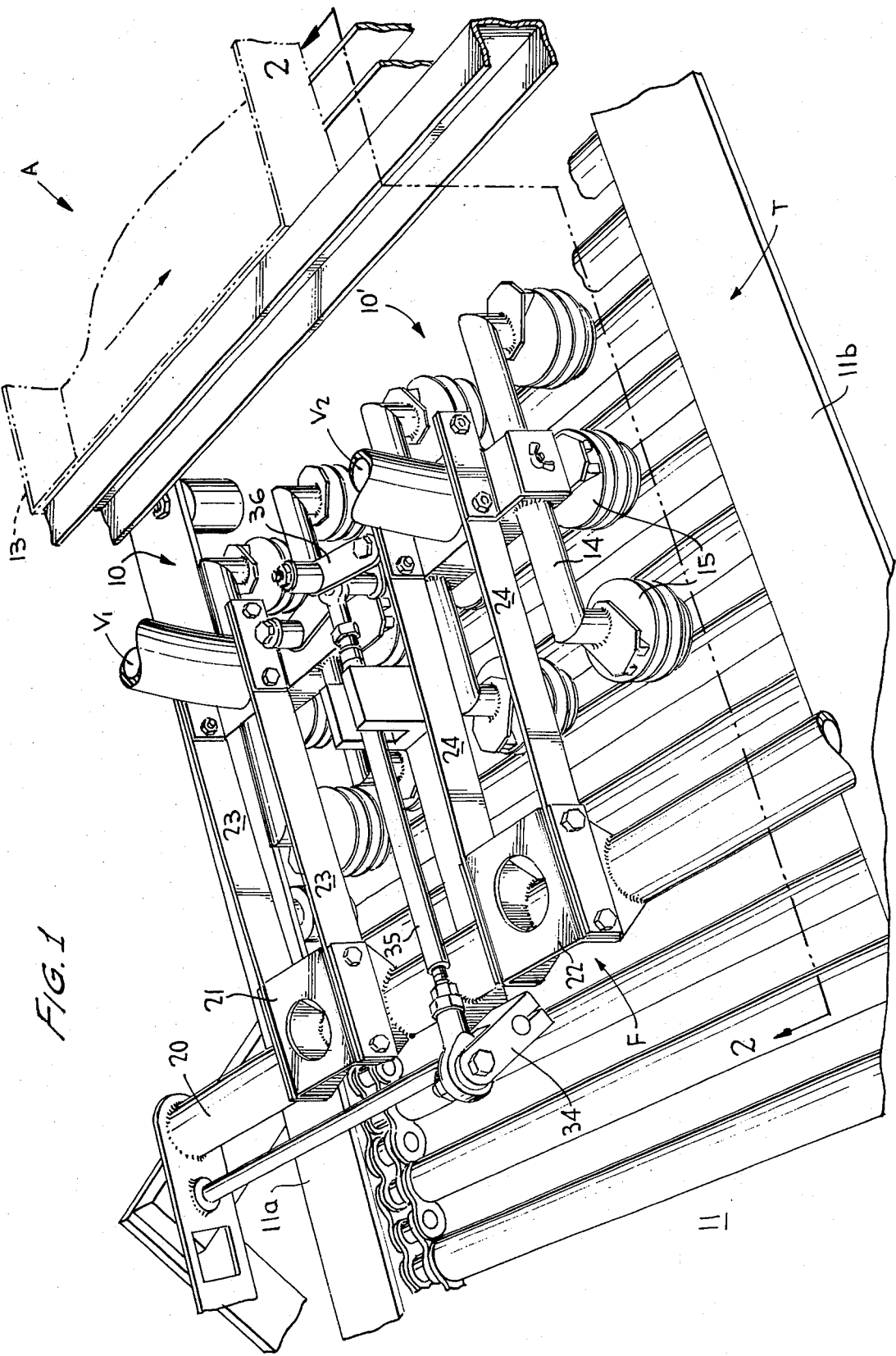
FIG. 1 is an overall perspective view of the article transfer system of the present disclosure utilizing gang mounted suction pickup cups.

With reference now to FIGS. 1–3 of the drawings, there is shown in composite a system for transferring and positioning articles constructed in accordance with the teachings of the present disclosure. The apparatus includes an article transfer assembly, generally designated by the reference numeral 10, for operation in the transfer system in conjunction with an infeed conveyor 11. A transfer station, generally designated by the reference indicia T (see FIG. 2) is delineated by the conveyor 11 and side rails 11a, 11b below the assembly 10. An output conveyor 12 is positioned over the conveyor 11 and transverse thereto just downstream of the transfer station T. An output area A is delineated by the conveyor 12 with a packaging box 13 positioned in said area.

The transfer assembly 10 comprises a movable support means in the form of a framework F, a pneumatic manifold 14 carried by the framework F and connected to vacuum input line at $V_1$ and a plurality of pickup heads in the form o vacuum cups 15 supported on the arms of the manifold. In the embodiment shown, the transfer assembly 10 is designed to pick up a plurality of baked muffins or other articles 16 that are held in individual containers or sections of baking pan 17 and transfer the relatively delicate muffins 16 to the packaging box or tray 13 whereupon the package is then wrapped and completed by additional apparatus (not shown). Thus, it should be understood that within the more limited purview of the present invention, the transfer system illustrated, the sub-combination vacuum pickup cups and the related method all have particular applicability to the delicate article packaging field, but broadly, the inventive concepts are also applicable to other environments and products, as will be clear to those working in this field and as the detailed description develops below.

A second article transfer assembly 10' with vacuum input line $V_2$ may be provided in order to handle a second group of articles positioned on the conveyor 11. Both of these assemblies 10, 10' are carried by a cross bar 20 of the framework F through brackets 21, 22, which in turn are connected to the assemblies 10, 10' by flexible parallel support members 23, 24. A main operating arm 25 is connected to the cross bar 20. An actuating lever 26 mounted on stationary pivot 27 serves to move the assemblies 10, 10' through drive pin 30 carried by the arm 25 between the position at the transfer station T (FIG. 2) to the position at the output area A (refer to FIGS. 4 and 5). The drive means for actuating the lever 26 are conventional and may comprise in a typical machine a crank that is driven from the main drive of the packaging machine (not shown).

Drive pin 30 that serves primarily to interconnect the lever 26 to the arm 25 for transmitting the oscillating movement to move the assemblies 10, 10' between the two operative positions just described, is also mounted for pivoting action in response to a second lever 31 that is actuated by push rod 32. The push rod 32 may be separately operated by mechanism (not shown) to complement the action due to the oscillating movement of the assemblies 10, 10'. Adjacent the center of the cross bar 20 (see FIG. 3), a bracket 33 supports the end of the pin 30. A crank 34 on the pin operates a reciprocating link 35 which in turn controls scissors linkage 36 connected to the manifolds 14, 14'. When the link 35 is moved to the left, as viewed in FIG. 3, the transfer assemblies 10, 10' are moved apart with the support member pairs 23, 24 flexing as necessary; whereas, when the link is moved to the right the assemblies 10, 10' are moved closer together, as is readily apparent.

A control link 40 works in conjunction with the operating lever 26 to form a parallelogram linkage, and therefore serves to keep the assemblies 10, 10' substantially horizontal and in proper relationship to the transfer station T and the output area A. As will also be apparent, the fine control of the assemblies 10, 10' and the substantially vertical motion for pick up and delivery phases may be accomplished by relatively small secondary movements through the link 40.

Figure 4:
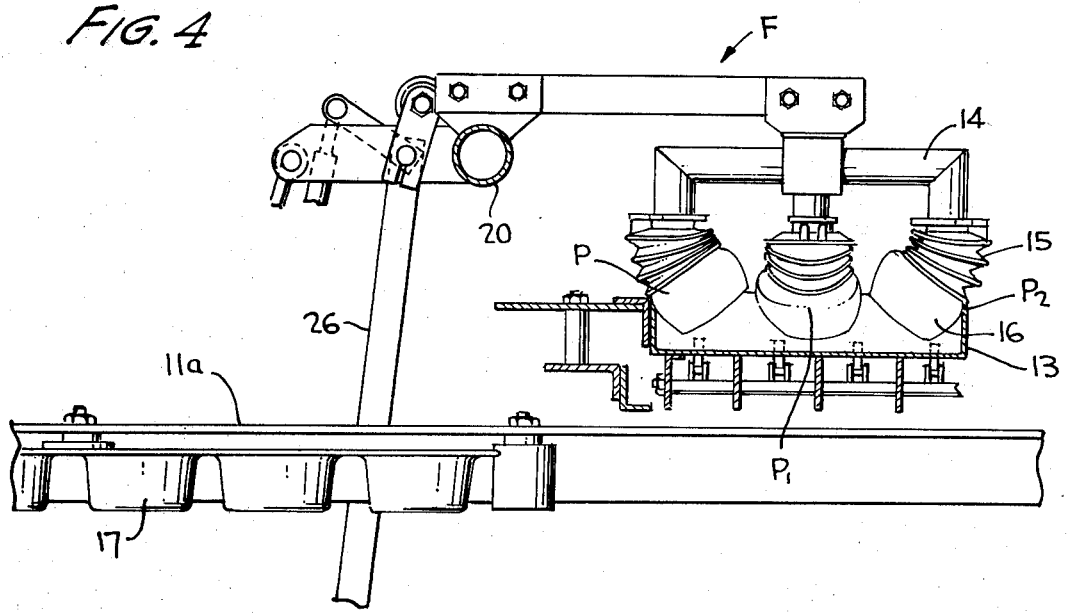
FIG. 4 is a side view of the apparatus showing the articles moved to the output area at the packaging tray and with the articles tilted for pattern shrinkage.
Figure 5:
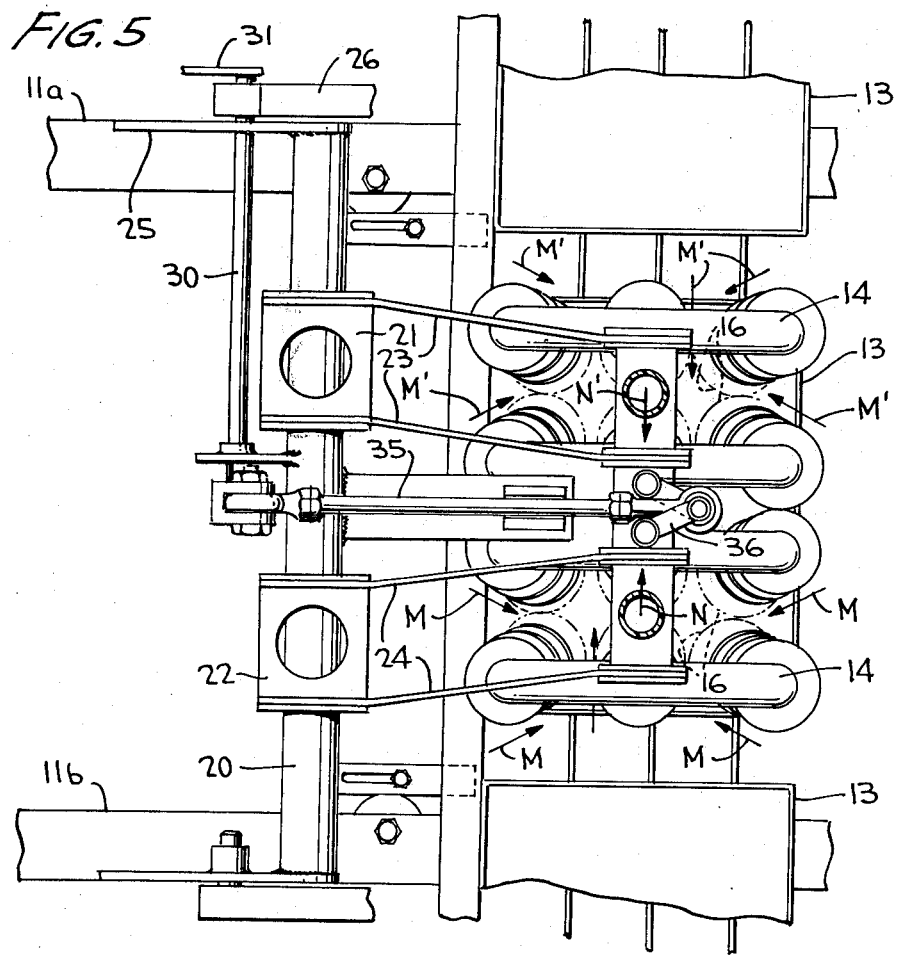
FIG. 5 is a top plan view of the apparatus in the same position as FIG. 4, further illustrating the pattern shrinkage concept.

In accordance with an important feature of the present invention, the suction cups 15 handle the muffins or other articles 16 so that the pattern or spatial requirement of the articles may be changed or adjusted simply as a function of the pickup action of the cups. This is accomplished by making the cups perform a tilting action, as shown best in the system in FIG. 4, and in further detail in FIG. 8. Specifically, the cups 15 tilt to move toward an adjacent cup as a result of differential collapse of one side of the cup relative to the other. As shown in FIGS. 4 and 5, the cups 15 are mounted so that the direction of the tilting action is toward the center of the box 13 in which the articles 16 are being placed. Because of the spaced apart relationship of the containers or sections of the baking or muffin pans 17, the spatial relationship required is being changed in order to allow the articles 16 to be placed in a more compact package. This is known in the art as pattern shrinking.

It should be specifically noted that the six unit pattern shrinkage effected within each assembly 10, 10' is done without use of any sort of mechanical linkage. Furthermore, since the pickup cups 15 are tilted to perform the compacting function, the articles are assured of being safely released into the tray 13. The articles 16 actually gently pivot into final position (see FIGS. 4 and 8). There is generated little or no relative motion with respect to the adjacent articles 16 as pivoting takes place about the upper edge of the articles (see points P, $P_1$, $P_2$ in FIG. 4). Particularly when muffins 16 or other resilient bake goods are being used, any slight oversize of the articles 16 can be easily accommodated as they enter the tray 13 in a tilted condition and then pivot together into the bottom of the tray when the vacuum is released.

By reviewing FIGS. 1–5, the initial steps of the method of transferring and positioning an array of articles according to the present disclosure can now be set forth. The cups 15 are positioned in a home position stationed above the articles 16 substantially as shown in FIGS. 1 and 2. The actuating lever 26 holds the assemblies 10, 10' in this position until a pan 17 and a packaging tray 13 are sensed in the proper transfer positions at the transfer station T and the output area A, respectively, in accordance with known techniques. When ready, the assemblies 10, 10' and the gang of cups 15 move downwardly under the control of the lever 26 and the link 40 to approach the top of the articles 16. Vacuum is supplied to the vacuum input lines $V_1$, $V_2$ and when the bottoms of the cups 15 actually touch the articles 16 sufficient negative pressure is generated in each cup 15 to hold each corresponding article 16 by the greater ambient air pressure on the outside. Because of their flexible nature, and stiffening means on one side (to be explained further below) the cups 15 tend to collapse and tilt causing the articles to be raised and tilted toward the middle of each polygon pattern. The lever 26 is now starting to move the assemblies 10, 10' upwardly through the home position and toward the output area A, as will be described further also.

An advantage of the present arrangement over the non-tilting type of transfer assemblies shown in the prior art, is that the articles 16 are lifted and tilted slightly and air is allowed to quickly rush into the bottom of each of the sections of the pan 17 to break the vacuum as the cups 15 collapse. This is particularly important when transferring porous bakery products, such as the muffins 16, since the tendency is for a vacuum to be formed in the bottom of the containers by the air sucked through said muffins 16 and into the cups 15. As a result, the muffins 16 are efficiently removed from the snug relationship in the individual containers formed in the pan 17 without damage to the articles, such as separation of the top from the bottom.

The six cups 15 in both assemblies 10, 10' form closed polygon patterns with the action as in FIG. 5 wherein the articles 16 are all moved toward the center, as depicted by the arrows M, M'. A more compact pattern than heretofore possible in the two horizontal directions is thus gained by the transfer assembly 10 of the present invention. Full tilting action is normally allowed immediately or after each article 16 clears the top of the containers due to collapse of the cups 15 and the resilient nature of the cups 15 and the articles 16.

In the further steps of the method of the disclosure, after clearance of the containers, the push rod 32 is actuated to pivot the second lever 31 and through the linkage including the pin 30 shifts the link 35 activating the scissors mechanism 36 and drawing the assemblies 10, 10' together (note arrows N, N' in FIG. 5). This action is important since it will be remembered that the articles 16 along the two inside rows picked up by the assemblies 10, 10' have been shifted in the direction of the center of each polygon pattern, and therefore these two rows must be brought together mechanically. This is, of course, in the instance where the tray 13 is of the size requiring this composite number of articles and reduction in size of the overall pattern. On the other hand, the mechanical scissors linkage 36 may be utilized to shift the assemblies 10, 10' further away from each other where, for example, two groups of articles are to be placed in separate trays at the output area A. The assemblies 10, 10' finally move to the position with the articles 16 in the tray 13, the vacuum is released and the articles 16 pivot to gently come to rest in the tray or trays. The assemblies 10, 10' are then returned to the home position above the next array of articles in readiness for the next cycle of the packaging machine (FIG. 2).

It will be realized that the tilting cups 15 may be utilized to spread the individual pattern or patterns of articles 16 rather than to shrink the pattern, as is disclosed in the preferred embodiment. All that need be done in the present machine to accomplish this, is to rotate the cups 15 on the manifold outlet arms whereby the articles 16 are tilted in the opposite direction. That is, if the cups 15 are rotated through 180° on the outlets, it will be realized that the pattern is spread outwardly to a maximum extent, and when the vacuum is released the spatial positioning of the group of articles in the output area is a maximum rather than a minimum.

Now that the overall article transfer system and the method of the present disclosure has been explained, attention should be directed to the specific inventive structure of the pickup cups 15. As best shown in FIGS.

Figure 7:
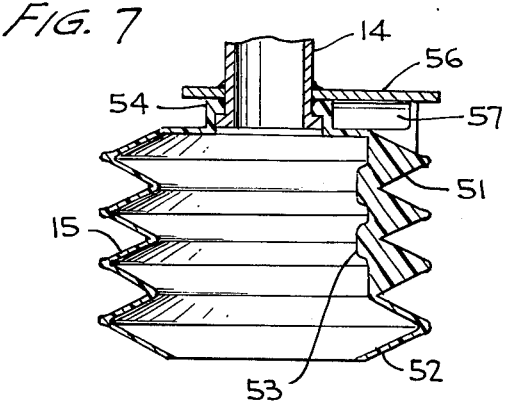
FIG. 7 is a cross-sectional view taken through the pickup cup shown in FIG. 6 at line 7—7 and with the cup mounted on the support and the index means in position.

6–8 the cups 15 comprise a plurality of annular folds 50 so as to be in the form of an accordion-like structure. The anti-collapse stiffening means is preferably formed by wedges 51 positioned on one side of the cups 15 opposite from the direction of the tilting movement inside the folds 50. These wedges 51, as best shown in FIG. 7, are not included in the bottom fold which then provides a resilient lip 52 that is capable of forming an airtight seal on the article 16 being picked up. The inside of the cups 15 are further provided with reinforcement beads 53 that span the inside limit of the annular folds on the stiffened or reinforced side having the wedges 51 and serve to interconnect the adjacent wedges to further assure against collapse of this side of the cup.

Figure 6:
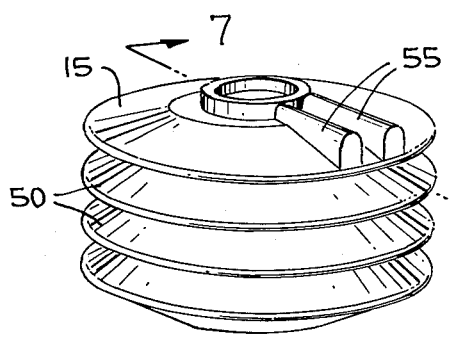
FIG. 6 is a perspective view of the sub-combination vacuum pickup cup constructed in accordance with the principles of the present invention.

To attach the cup on each outlet of the arms of the manifold 14, there is provided a circular shoulder 54 on the cup. Positioned on said stiffened side (righthand side of FIGS. 6 and 7) and extending between the shoulder 54 and the upper fold is a bifurcated wedge member 55. This wedge 55 serves the function of preventing collapse of the cup 15 at the top thereof. A reaction plate 56 mounted on the manifold 14 engages the wedge member 55, as shown in FIG. 7. An index button 57 extends from the plate 56 and is designed to fit between the bifurcated portions of the member 55 so as to assure proper rotational positioning of the cups 15 for a particular installation. The index button 57 is on the one side of the cup 15 opposite from the direction of tilt, as is apparent from the anti-collapse action of the wedges 51, 55.

For change in the cup tilting direction, it is only necessary to rotate the cups 15. The index button 57 may be changed to the new location if desired. In the embodiment shown, where pattern shrinkage only is used, no provision for adjustment of the position of the button 57 has been designed into the system.

Figure 8:
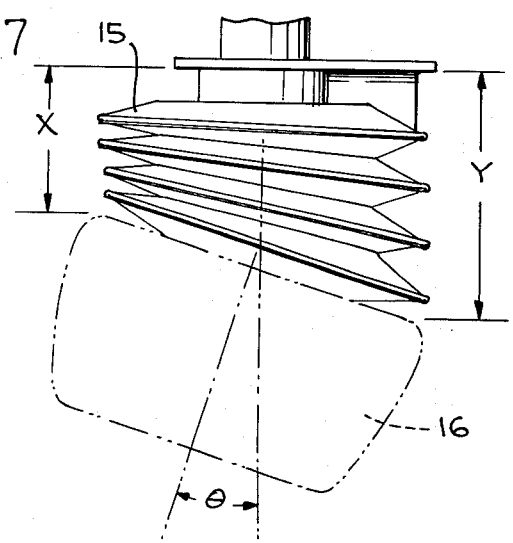
FIG. 8 is a side view of the pickup cup and illustrating the tilting action of an article being transferred.

The differential collapse of the cups 15 is shown most clearly in FIG. 8 and can be described by the Equation: $Y - X =$ differential collapse. This differential collapse is operative to provide a tilt to the articles 16 through an angle $\theta$, which is preferably within the range of 15° to 30°. This angle is sufficient to provide the tilt necessary for the initial equalization of pressure between the articles 16 and the inside wall of the containers to thereby assist in the initial removal of the articles from the pan 17.

Figure 9:
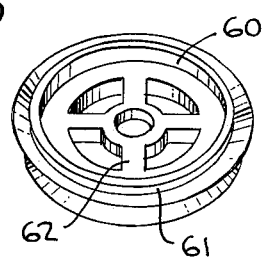
FIG. 9 is a perspective view of a screen to be used with the pickup cup under certain conditions.
Figure 10:
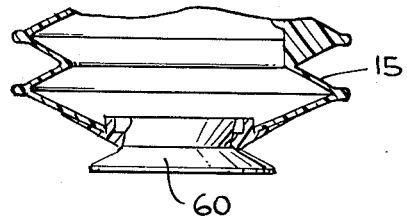
FIG. 10 is a detailed cross-section of the bottom of the pickup cup with screen.

In FIG. 9, a screen member 60 is shown having an attachment groove 61 and cross members 62. This attachment is adapted to fit over the opening of the cup 15 by interfitting of the groove 61 to the lower edge of the lip 52, as shown in FIG. 10. This screen may be used as necessary where particularly delicate articles are being handled, and a restricted air flow is desired. The cross members 62 serve to afford better support of the top of such delicate articles and prevent the same from being removed and entering the cup 15 when suction is applied.

In summary, it can now be seen that a simplified and more efficient article transfer system has been provided wherein a group of articles 16 is to be transferred from one point to another, and at the same time, the relative positioning of the articles with respect to each other as a group is to be changed. In essence, the array of articles situated in a plane can either be compacted or spread automatically during the transfer operation by providing suction cups that tilt the article as said articles are picked up. One side of the pickup cup 15 of the present invention is provided with wedge members 51, 55 and reinforcement beads 53 that prevent the collapse of one side, and upon activation a tilting action (FIG. 8) in the direction opposite to said one side is realized. The top wedge member 55 serves to cooperate with an index button 57 in order to assure proper positioning of the cups on the vacuum manifold 14. When the array of articles is in the form of a polygon, as shown, the tilting of the cups gives two-dimensional horizontal adjustment of the pattern by merely directing the tilting action of the cups toward the center of the polygon. Various arrangements of two or more transfer assemblies 10, 10' may be used and separate mechanical linkage 35–36 may be used to effect composite spatial positioning, either toward or away from each other, of the two article arrays.

In this disclosure, there is shown and described only the preferred embodiment of the invention, but, as aforementioned, it is to be understood that the invention is capable of use in various other combinations and environment and is capable of changes or modifications within the scope of the inventive concept as expressed herein.

What is claimed is:

1. A vacuum pickup cup for transferring and positioning an article comprising a collapsible body terminating in a lip means forming a vacuum opening, integral stiffening means on one side of said body to resist collapse, the opposite side being substantially free to collapse, said body being laterally flexible during both relaxation and collapse of said body, said body except for said lip means remaining free of said article, whereby said cup and substantially the entire article tilt toward the side free to collapse when vacuum is applied thereto while remaining subject to outside accommodating force and substantially the entire article is picked up.

2. A vacuum pickup cup for transferring and positioning an article comprising a collapsible body terminating in a lip means forming a vacuum opening, integral stiffening means on one side of said body to resist collapse, the opposite side being substantially free to collapse, said body having a plurality of annular folds, said stiffening means including wedge members positioned in and corresponding to said folds on said one side, whereby said cup and the article tilt toward the side free to collapse when vacuum is applied thereto and the article is picked up.

3. The vacuum pickup cup of claim 2 wherein said folds each include an inside limit and there is further provided reinforcement bead means spanning the inside limit of said annular folds and interconnecting adjacent wedge members to further assure against collapse.

4. The vacuum pickup cup of claim 3 wherein is further provided a two part wedge member on the top of said cup to stiffen the same, the two parts of said wedge member corresponding to the fold and the space between said two parts being adapted to receive index means for proper orientation.

5. The vacuum pickup cup of claim 2 wherein said lip means includes at least the fold adjacent said opening, said fold being free of stiffening means on said one side.

* * * * *